US012009511B2

(12) United States Patent
Kim et al.

(10) Patent No.: US 12,009,511 B2
(45) Date of Patent: Jun. 11, 2024

(54) METHOD TO PROTECT A LITHIUM METAL ANODE IN A RECHARGEABLE LITHIUM METAL BATTERY

(71) Applicant: International Business Machines Corporation, Armonk, NY (US)

(72) Inventors: Yumi Kim, San Jose, CA (US); Amaresh Samuthira Pandian, San Jose, CA (US); Holt Bui, Santa Clara, CA (US); Jangwoo Kim, San Jose, CA (US); Young-Hye Na, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 17/676,019

(22) Filed: Feb. 18, 2022

(65) Prior Publication Data

US 2023/0268492 A1    Aug. 24, 2023

(51) Int. Cl.
*H01M 4/38* (2006.01)
*H01M 4/62* (2006.01)
*H01M 10/0569* (2010.01)
*H01M 10/058* (2010.01)

(52) U.S. Cl.
CPC .......... *H01M 4/382* (2013.01); *H01M 4/388* (2013.01); *H01M 4/625* (2013.01); *H01M 10/0569* (2013.01); *H01M 10/058* (2013.01); *H01M 2300/0054* (2013.01)

(58) Field of Classification Search
CPC ...... H01M 4/382; H01M 4/388; H01M 4/625; H01M 10/0569; H01M 10/058; H01M 2300/0054
See application file for complete search history.

(56) References Cited

U.S. PATENT DOCUMENTS

| 4,861,573 | A | 4/1989 | deNeufville et al. |
| 7,192,564 | B2 | 3/2007 | Cardarelli et al. |
| 7,381,290 | B2 | 6/2008 | Spencer et al. |
| 7,381,391 | B2 | 6/2008 | Spencer et al. |
| 7,521,153 | B2 | 4/2009 | Li et al. |
| 9,085,813 | B2 | 7/2015 | Saito et al. |
| 10,160,036 | B2 | 12/2018 | Wietelmann et al. |
| 10,581,072 | B2 | 3/2020 | Jung et al. |
| 10,741,836 | B1 | 8/2020 | Ansari et al. |
| 11,165,093 | B2 | 11/2021 | Kim et al. |
| 11,316,199 | B2 | 4/2022 | Kim et al. |
| 11,335,908 | B2 | 5/2022 | Kim et al. |
| 2005/0048371 | A1* | 3/2005 | Nagayama .......... H01M 4/0404 429/236 |
| 2005/0112462 | A1* | 5/2005 | Marple ................. H01M 4/581 429/94 |
| 2006/0019168 | A1 | 1/2006 | Li et al. |
| 2007/0218364 | A1* | 9/2007 | Whitacre ............. H01M 4/621 429/231.95 |
| 2016/0032207 | A1* | 2/2016 | Joshi ..................... C10L 3/105 423/239.1 |
| 2016/0121396 | A1 | 5/2016 | Wietelmann et al. |
| 2016/0232858 | A1* | 8/2016 | Pan ..................... G02B 26/001 |
| 2016/0351973 | A1 | 12/2016 | Albano et al. |
| 2017/0025683 | A1 | 1/2017 | Park et al. |
| 2018/0151875 | A1 | 5/2018 | Jung et al. |
| 2020/0152975 | A1 | 5/2020 | Archer et al. |
| 2021/0399332 | A1 | 12/2021 | Kim et al. |
| 2022/0200052 | A1 | 6/2022 | Kim et al. |
| 2022/0231295 | A1 | 7/2022 | Kim et al. |
| 2022/0416221 | A1* | 12/2022 | Jung ..................... H01M 4/382 |

FOREIGN PATENT DOCUMENTS

| CN | 109818045 A | * | 5/2019 |
| EP | 0953197 B1 | | 12/2004 |
| EP | 1305838 B1 | | 2/2007 |
| WO | WO 2005/008829 | * | 1/2005 |
| WO | WO 2021/172879 | * | 9/2021 |

OTHER PUBLICATIONS

Machine translation of WO 2005/008829, published on Jan. 27, 2005 (Year: 2005).*
Machine translation of CN 109818045 A, published on May 28, 2019 (Year: 2019).*
Harsha, S., Dasharath, S.M.—Effect of cryogenic heat treatment & ageing on ultra fine grained aluminum-lithium alloy—A review, Matreials Today: Proceedings 45 (2021)338-348 (Year: 2021).*
Park, Y.S., Kodama, S., Sekiguchi, H.—Preparation of Metal Nitride Particles Using Arc Discharge in Liquid Nitrogen, Nanomaterials, 2021,11,2214, https://doi.org/10.3390/nano11092214 (Year: 2021).*
Huang, Z., Liu, P., Duan, Q., Zhao, C., Wamg, Q.—Experimental investigation on the cooling and suppression effects of liquid nitrogen on the thermal runaway of lithium ion battery, Journal of Power Sources 495 (2021)229795 (Year: 2021).*
Cabana et al., Beyond Intercalation-Based Li-Ion Batteries: The State of the Art and Challenges of Electrode Materials Reacting Through Conversion Reactions, Advanced Materials 22(35):E170-E192 (2010).
Etacheri et al., Challenges in the development of advanced Li-ion batteries: a review, Energy & Environmental Science 4(9):3242-3262 (2011).
Futurama et al., Lithium Nitride Formation on Lithium Metal, The Electrochemical Society ECS Meeting Abstract #1137, MA2012-02 (Honolulu, 2012).
Heller, Potentially implantable miniature batteries, Analytical and Bioanalytical Chemistry 385:469-472 (2006).

(Continued)

*Primary Examiner* — Anca Eoff
(74) *Attorney, Agent, or Firm* — Scott S. Dobson

(57) ABSTRACT

A rechargeable metal halide battery fabricated with a liquid nitrogen treated metallic anode demonstrates a stable cycle life with a slow rate of degradation and high discharge capacity in comparison to battery cells with untreated anodes. The anode, which may be an alkali metal and/or an alkaline earth metal, is pretreated with the liquid nitrogen prior to formation in a battery stack. The liquid nitrogen treatment forms a metal nitride on a surface of the anode that (i) increases the surface area of the anode, (ii) acts as a passivation layer that prevents detrimental SEI-forming side reactions that degrade anodes, and (iii) suppresses dendrite growth. Where the anode is lithium, the metal nitride is lithium nitride ($Li_3N$).

19 Claims, 7 Drawing Sheets

(56) References Cited

OTHER PUBLICATIONS

Karden et al., Energy storage devices for future hybrid electric vehicles, Journal of Power Sources 168(1):2-11 (2007).
Ma et al., A lithium anode protection guided highly-stable lithium-sulfur battery, Chemical Communications 50(91):14209-14212 (2014).
Park et al., Dendrite-Suppressed Lithium Plating from a Liquid Electrolyte via Wetting of Li3N, Advanced Energy Materials 7(19):1700732 (2017).
Ryou et al., Mechanical Surface Modification of Lithium Metal: Towards Improved Li Metal Anode Performance by Directed Li Plating, Advanced Functional Materials 25(6):834-841 (2014).
Tarascon et al., Issues and challenges facing rechargeable lithium batteries, Nature 414:359-67 (2001).
Vajenine, On reactions between alkali metals and active nitrogen, Solid State Sciences 10:450-454 (2008).
Wu et al., Electrochemical behaviors of a Li3N modified Li metal electrode in secondary lithium batteries, Journal of Power Sources 196:8091-8097 (2011).
Xu et al., Nonaqueous Liquid Electrolytes for Lithium-Based Rechargeable Batteries, Chemical Reviews 104(10):4303-4417 (2004).
Xu et al., Lithium metal anodes for rechargeable batteries, Energy & Environmental Science 7(2):513-537 (2014).

* cited by examiner

METHOD TO PROTECT A LITHIUM METAL ANODE IN A RECHARGEABLE LITHIUM METAL BATTERY

TECHNICAL FIELD

The present invention relates generally to rechargeable batteries and more specifically to a method of protecting a metal anode in a rechargeable lithium metal battery.

BACKGROUND OF THE INVENTION

Rechargeable batteries are in high demand for a wide range of applications, from small batteries for industrial and medical devices to large batteries for electric vehicles and grid energy storage systems. Despite the progress that has been made on improving batteries over the past several decades, battery chemistry performance remains insufficient to satisfy the commercial standards expected in the marketplace.

There are two types of rechargeable batteries currently in use: (i) batteries that run via electrochemical intercalation/de-intercalation behavior of acting ions and (ii) batteries that run via conversion reaction of active electrode/electrolyte materials. The most well-known and widely used rechargeable batteries are lithium-ion (Li-ion) batteries, which have an intercalated lithium compound as one electrode material and where lithium ions move back and forth in a pond of electrolyte between an anode and a cathode where at least one of the anode or cathode provides the source of the lithium ions. The use of lithium metal as an anode material has been widely used as a way to improve the energy density of batteries; however, lithium metal anodes have their own limitations, including dendrite formations and the intrinsic reactivity of lithium metal to electrolyte compounds.

SUMMARY OF THE INVENTION

In one aspect, the present invention relates to a method of fabricating a battery comprising: forming a battery stack comprising a metallic anode treated for 1-100 seconds with liquid nitrogen to form a passivation layer comprising a nitrogen-containing compound on a surface of the metallic anode, a cathode, and an electrolyte comprising at least one ion-conducting material, wherein the electrolyte is in physical contact with the anode and the cathode.

In another aspect, the present invention relates to a method of fabricating a battery comprising: pre-treating a lithium anode for 1-100 seconds with liquid nitrogen to form a lithium nitride passivation layer on a surface of the anode; and forming a battery stack comprising the pre-treated lithium anode, a cathode comprising a metal halide incorporated into an electrically conductive material, and an electrolyte comprising at least one organic solvent and at least one ion-conducting material, wherein the electrolyte is in physical contact with the anode and the cathode.

Additional aspects and/or embodiments of the invention will be provided, without limitation, in the detailed description of the invention that is set forth below.

DETAILED DESCRIPTION OF THE INVENTION

Figure 1:
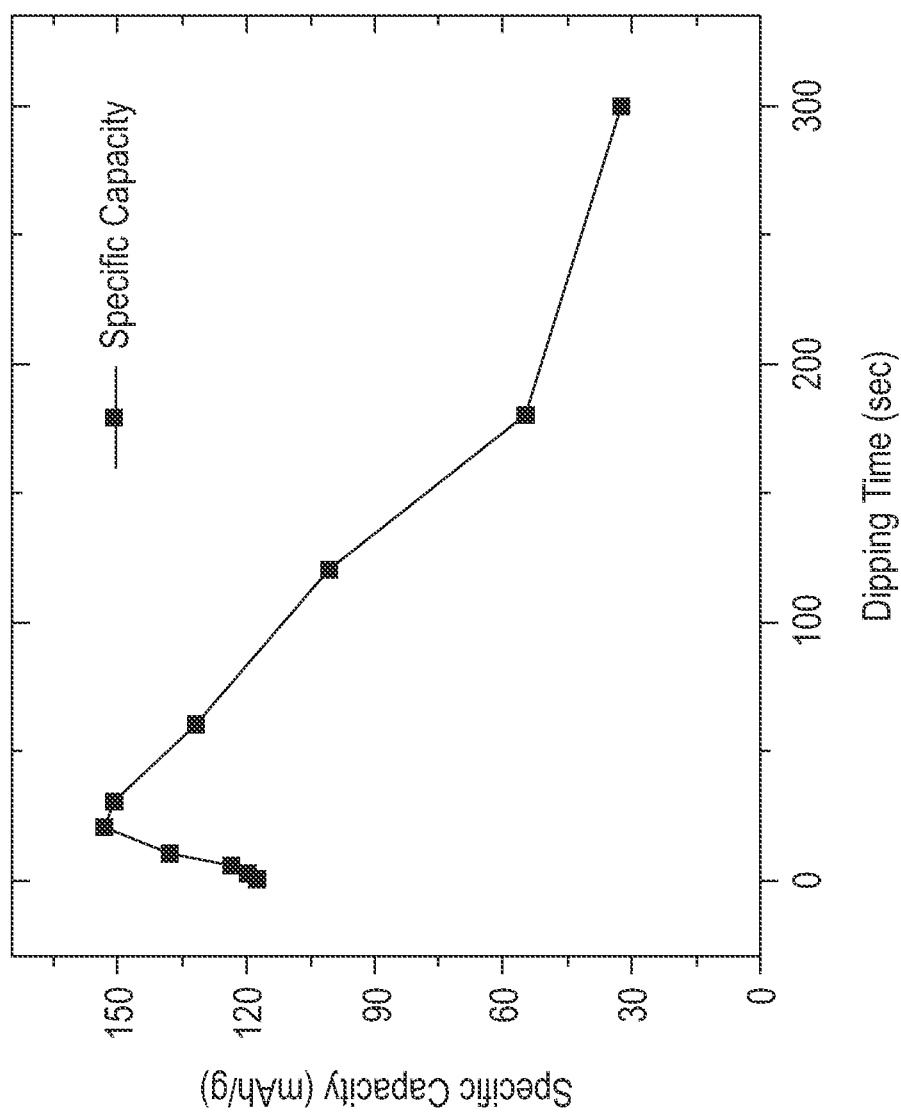
FIG. 1 is a graph showing the specific capacity versus dipping time of lithium metal in liquid nitrogen acquired at a current density of 5 mA/cm$^2$ with an active cathode loading of 10 mg/cm$^2$.

Set forth below is a description of what are currently believed to be preferred aspects and/or embodiments of the claimed invention. Any alternates or modifications in function, purpose, or structure are intended to be covered by the appended claims. As used in this specification and the appended claims, the singular forms "a," "an," and "the" include plural referents unless the context clearly dictates otherwise. The terms "comprise," "comprised," "comprises," and/or "comprising," as used in the specification and appended claims, specify the presence of the expressly recited components, elements, features, and/or steps, but do not preclude the presence or addition of one or more other components, elements, features, and/or steps.

As used herein, the term "anode" refers to the negative or reducing electrode of a battery cell that releases electrons to an external circuit and oxidizes during an electrochemical process.

As used herein, the term "cathode" refers to the positive or oxidizing electrode of a battery cell that acquires electrons from the external circuit and is reduced during the electrochemical process.

As used herein, the term "electrolyte" refers to a material that provides ion transport between the anode and cathode of a battery cell. An electrolyte acts as a catalyst for battery conductivity through its interaction with the anode and the cathode. Upon battery charging, an electrolyte promotes the movement of ions from the cathode to the anode and on discharge, the electrolyte promotes the movement of ions from the anode to the cathode.

As used herein, the term "oxidizing gas" refers to a gas that induces a reduction-oxidation (redox) reaction in a rechargeable battery. Examples of oxidizing gases include, without limitation, oxygen, air, nitric oxide, nitrogen dioxide, and combinations thereof. As is known to those of skill in the art, a redox reaction is a reaction that transfers electrons between (i) a reducing agent that undergoes oxidation through the loss of electrons and (ii) an oxidizing agent that undergoes reduction through the gain of electrons.

As used herein, the term "metal halide" refers to a compound having a metal and a halogen. The metals of metal halides generally include any metal in Groups 1 to 16 of the periodic chart, but will typically be Group 1 alkali metals. The halides of the metal halides will be any halogen in Group 17 of the periodic chart.

As used herein, the term "nitride" refers to a compound of nitrogen where the nitrogen has an oxidation state of −3 ($N^{3-}$). Within the context of the present invention, a nitride will react with the metallic anode of a metal halide battery. One example of a metal nitride is lithium nitride ($Li_3N$), which will be found on the surface of lithium metal anode in a lithium halide battery.

As used herein, the term "SEI" refers to a "solid electrolyte interphase" layer. Starting from the first cycle of a metal halide battery, the electrolyte decomposes to form metal compounds on the anode surface, which forms the SEI layer. For example, where the metal is lithium, the electrolyte will decompose to form lithium compounds, which in turn form the SEI layer. Since the SEI layer contains numerous lithium compounds, the production of the SEI reduces the total charge capacity of the battery by consuming some of the lithium that would otherwise be used to store charge resulting in a battery with low Coulombic efficiency and low discharge capacity.

As used herein, the term "passivation layer" refers to a protective coating on the surface of a battery component that renders the surface of the component inert such that it does not interact with air or other materials in the component's environment.

As used herein, the term "overpotential" refers to the voltage measure difference between a thermodynamically determined voltage and the actual voltage under operating conditions. In a battery cell, the existence of overpotential means that less energy is recovered from the battery reaction than is thermodynamically predicted, with the missing energy being lost as heat. Overpotential is experimentally determined by measuring the potential at a given current density where the overpotential increases with increasing current density.

Described herein is a method of forming a rechargeable metal halide battery with a stable life cycle, a slow rate of degradation, and high discharge capacity by treating the metal anode of the battery with liquid nitrogen ($N_2$; −196° C.). For the treatment, the anode is exposed to liquid nitrogen for 100 seconds or less prior to formation in the battery stack without any additional pre- or post-treatments. The liquid nitrogen treatment forms a protective nitrogen-containing passivation layer on the surface of the anode.

With reference to FIG. 1, the specific capacity of a lithium iodide (LiI) battery at a current density of 5 mA/cm², active cathode (LiI) loading of 10 mg/cm², and a lithium metal anode exposed to liquid nitrogen at various intervals shows that there is a correlation between the amount of dipping time for the lithium metal in the liquid nitrogen and the overall capacity of the battery. As shown in FIG. 1, a battery cell prepared with a lithium metal anode dipped in liquid nitrogen for 1-100 seconds has higher discharge capacity than a battery cell with a pristine lithium anode. The lithium metal anode dipped in liquid nitrogen for 30 seconds showed the highest capacity with 30% capacity increase compared to a pristine lithium metal anode.

Figure 2B:
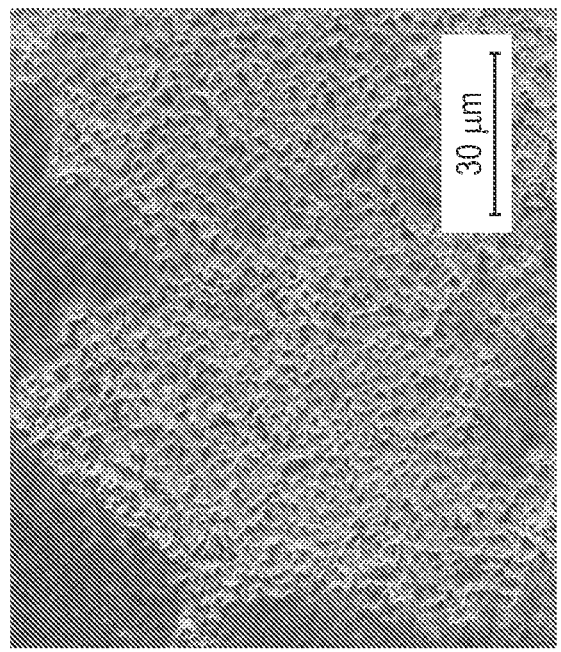
FIGS. 2A and 2B are scanning electron microscope (SEM) images of pristine (FIG. 2A) and liquid nitrogen treated (FIG. 2B) lithium metal.
Figure 2A:
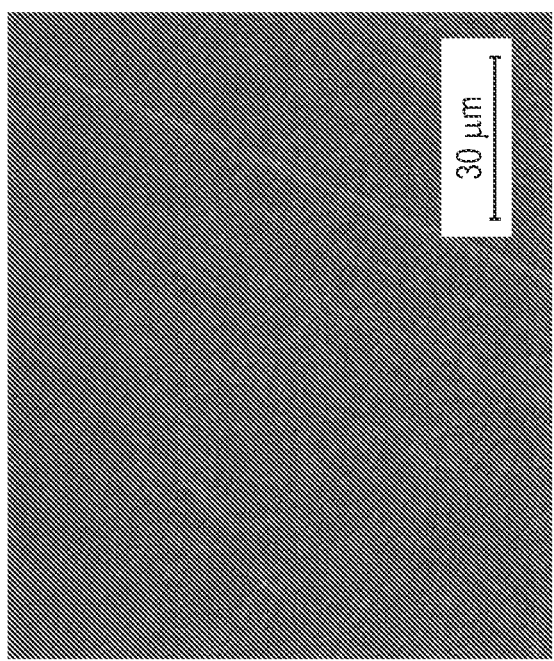

FIG. 2A is an SEM image of pristine lithium metal and FIG. 2B is an SEM image of lithium metal modified by treatment with liquid nitrogen for 30 seconds. The lithium that was exposed to the liquid nitrogen has surface morphologies that are absent from the pristine lithium. While the pristine lithium has a smooth and clear surface, the liquid nitrogen treatment of the lithium metal results in a $L_3N$ layer that is bumpy and uneven in certain areas. The bumpy and uneven surface morphology of the liquid nitrogen treated lithium results in a lithium metal that has a greater surface area to afford more lithium deposition.

Figure 3:
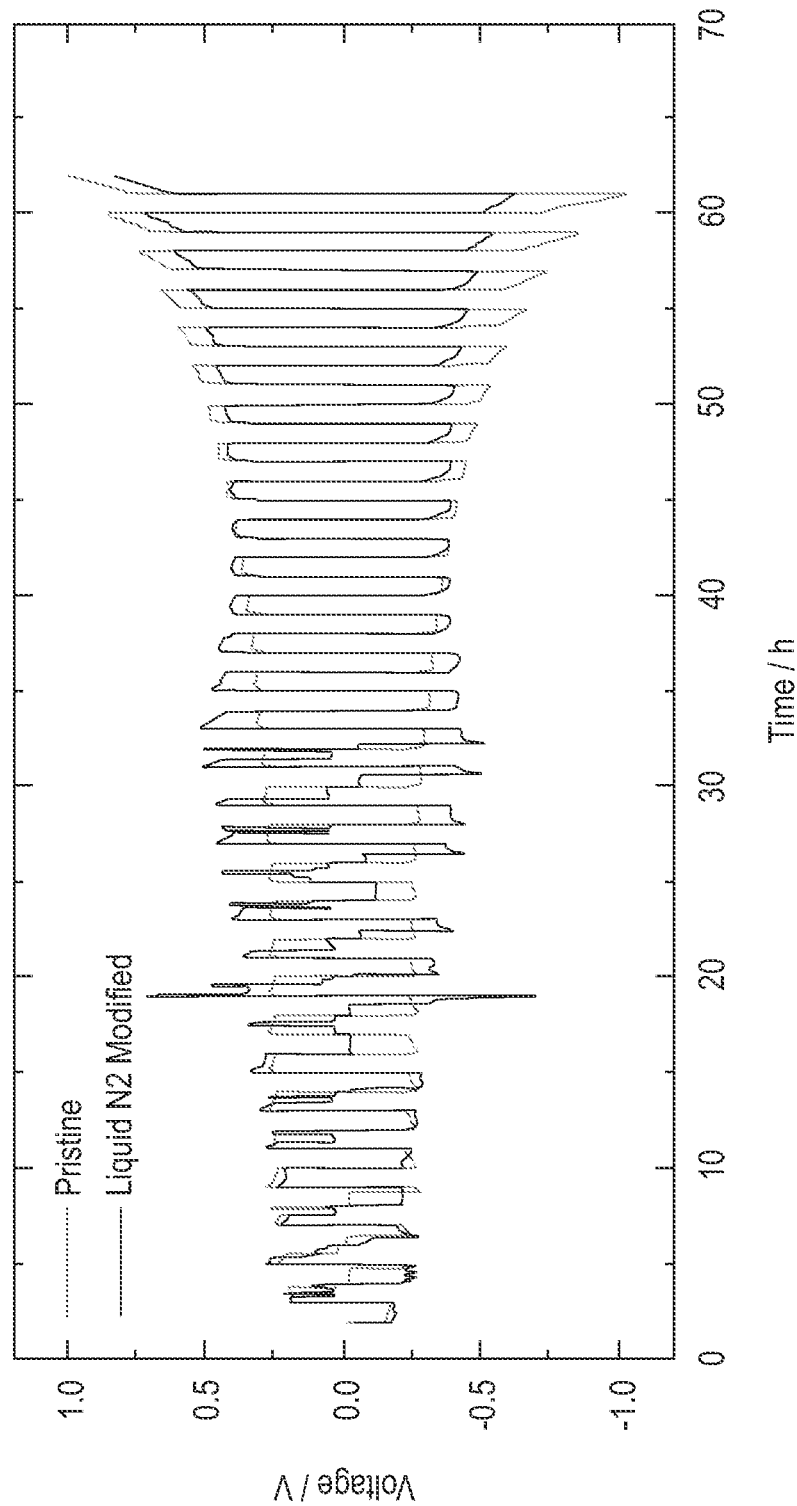
FIG. 3 is a graph showing the results of a symmetric cell test conducted on pristine lithium and liquid nitrogen treated lithium metal under a current density of 0.5 mA/cm$^2$.

With reference to FIG. 3, an electrochemical performance test conducted at a current density of 0.5 mA/cm² on symmetric cells fabricated with pristine lithium electrodes and liquid nitrogen treated lithium electrodes shows that the cell with the treated lithium electrodes has an unstable pattern during the initial plating and stripping reactions, but becomes stable after few cycles. While the initial resistance (i.e., overpotential) obtained from both cells are similar, the overpotential of the cell with the pristine lithium electrodes increases after 45 hours at which time cell degradation is observed. By contrast, the cell with the treated electrodes shows lower overpotential after 45 hours indicating a symmetric cell with a stable cycle life and a slow rate of degradation. The decrease in the overpotential of the battery cell with the liquid nitrogen treated lithium anode indicates that the liquid nitrogen treatment stabilizes lithium electrode surface, keeping it from involving unwanted side reactions during lithium striping and plating.

Figure 4A:
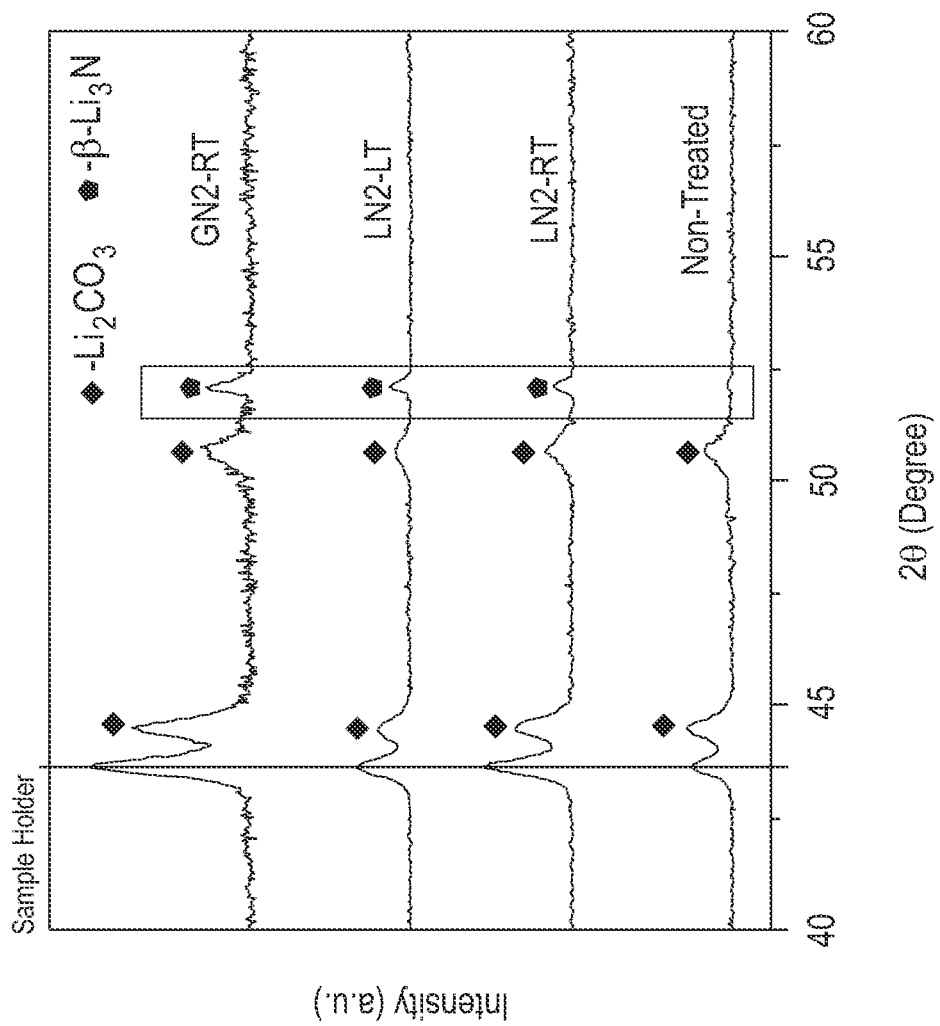
FIGS. 4A and 4B are graphs showing the XRD (FIG. 4A) and XPS (FIG. 4B) analysis of pristine lithium, liquid nitrogen treated, and gaseous N$_2$ treated lithium metal.
Figure 4B:
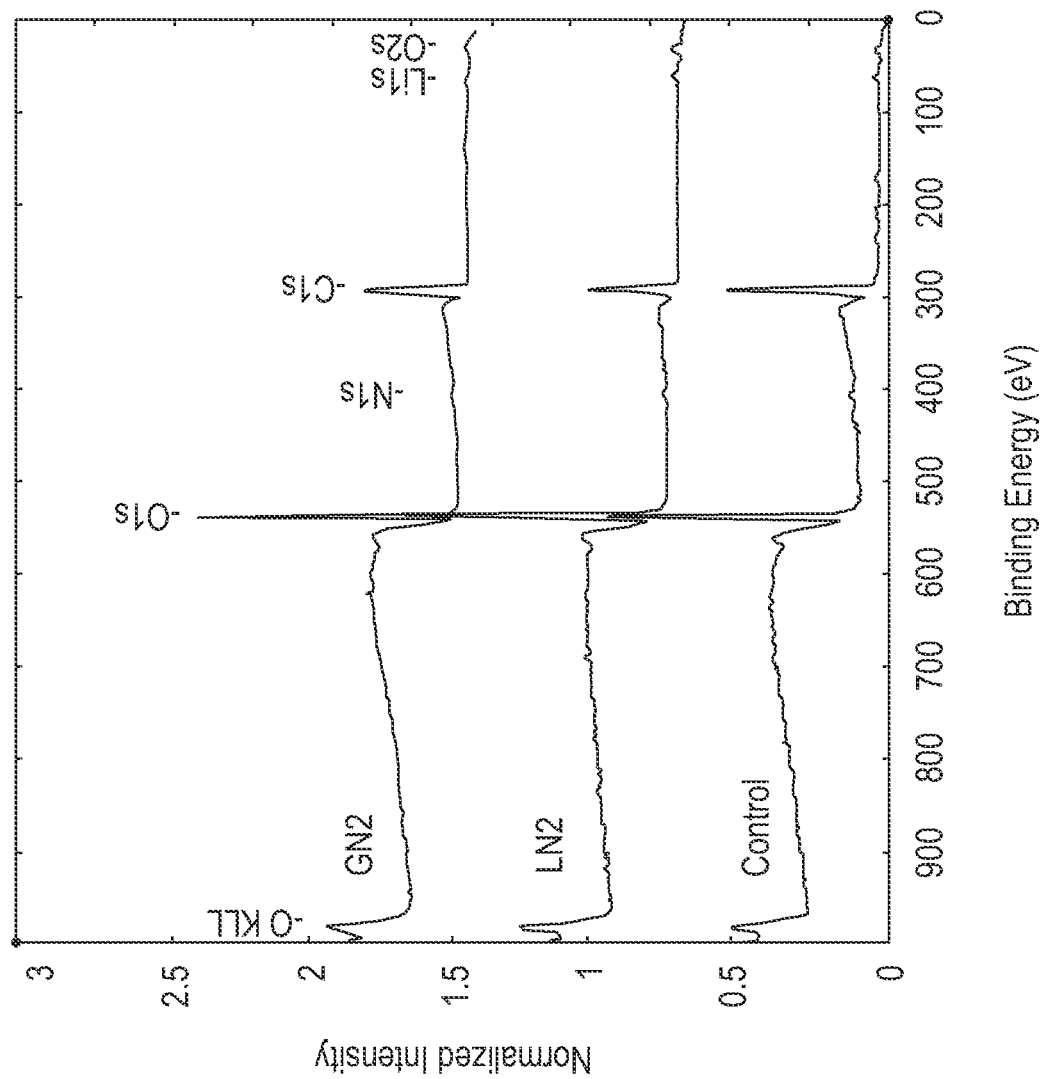

With reference to FIG. 4A, an x-ray diffraction (XRD) analysis of pristine lithium, liquid nitrogen (LN2) treated lithium, and gaseous nitrogen (GN2) treated lithium at room temperature (RT) and low temperature (LT, less than 0° C.) shows that lithium carbonate ($Li_2CO_3$) and lithium nitride ($Li_3N$) peaks are formed on the LN2-LT, LN2-RT, and GN2-RT treated lithium while the non-treated lithium has only $Li_2CO_3$ peaks as its native layer. Example 2 describes the process for formation of the passivation layers on the surface of the LN2-LT and LN2-RT lithium samples. In FIG. 4B, an x-ray photoelectron spectroscopy (XPS) analysis on the pristine lithium and the LN2 and GN2 treated lithium samples exposed to a nitrogen source for 30 sec shows that the LN2 treated lithium sample has a higher concentration of atomic nitrogen (N1s, originating from nitride) and a lower concentration of atomic oxygen (O1s, originating from lithium oxide, $Li_2O$) in comparison to the GN2 treated lithium sample. The atomic concentration for the samples shown in FIG. 4B are provided in TABLE 1. The value in bracket shows the atomic concentration normalized by the atomic concentration of C—C (C1s).

TABLE 1

| SAMPLE | Li1s | C1s C—C | C1s C—O | C1s O=C | C1s $CO_3$ | N1s nitride | N1s N—C | O1s $Li_2O$ | O1s |
|---|---|---|---|---|---|---|---|---|---|
| Control | 25.5 | 23.4 | 1.6 | 1.2 | 9.4 | 0.2 | 0.3 | 0.6 | 37.8 |
|  | (1.09) | (1.00) | (0.07) | (0.05) | (0.40) | (0.01) | (0.01) | (0.03) | (1.62) |
|  | 24.9 | 24.4 | 1.6 | 1.1 | 9.1 | 0.2 | 0.3 | 0.8 | 37.5 |
|  | (1.02) | (1.00) | (0.07) | (0.05) | (0.37) | (0.01) | (0.01) | (0.03) | (1.54) |

TABLE 1-continued

| SAMPLE | Li1s | C1s C—C | C1s C—O | C1s O=C | C1s $CO_3$ | N1s nitride | N1s N—C | O1s $Li_2O$ | O1s |
|---|---|---|---|---|---|---|---|---|---|
| LN2 | 28.8 | 31.2 | 0.9 | 1.5 | 2.0 | 0.6 | 0.3 | 0.3 | 34.5 |
|  | (0.92) | (1.00) | (0.03) | (0.05) | (0.06) | (0.02) | (0.01) | (0.01) | (1.11) |
|  | 28.4 | 31.9 | 0.9 | 1.0 | 1.1 | 0.7 | 0.3 | 0.2 | 35.4 |
|  | (0.89) | (1.00) | (0.03) | (0.03) | (0.03) | (0.02) | (0.01) | (0.01) | (1.11) |
| GN2 | 24.0 | 30.7 | 1.4 | 2.2 | 7.3 | 0.3 | 0.4 | 1.3 | 32.4 |
|  | (0.78) | (1.00) | (0.05) | (0.07) | (0.23) | (0.01) | (0.01) | (0.04) | (1.06) |
|  | 23.2 | 28.7 | 1.5 | 2.9 | 7.9 | 0.3 | 0.3 | 1.6 | 33.7 |
|  | (0.81) | (1.00) | (0.05) | (0.10) | (0.28) | (0.01) | (0.01) | (0.06) | (1.17) |

The atomic concentration analysis shows that both the LN2 and GN2 treated lithium samples have uniform chemical compositions on their surfaces, but that the LN2 treated lithium has more than 2 times higher nitride concentration than the GN2 treated lithium sample and 5 times lower $Li_2O$ concentration at the same exposure time. The data in FIGS. 4A, 4B, and TABLE 1 confirm that an $Li_3N$ layer is formed on the surface of a lithium metal treated with both liquid nitrogen and gaseous nitrogen, but that lithium treatment by liquid nitrogen is more efficient than gaseous nitrogen in forming an $Li_3N$-rich passivation layer. The formation of the $Li_3N$-rich passivation layer by the liquid nitrogen treatment: (i) increases the surface area of the anode, (ii) prevents detrimental SEI-forming side reactions that degrade anodes, and (iii) protects the anode by suppressing suppresses dendrite growth on the surface of the anode.

Figure 5:
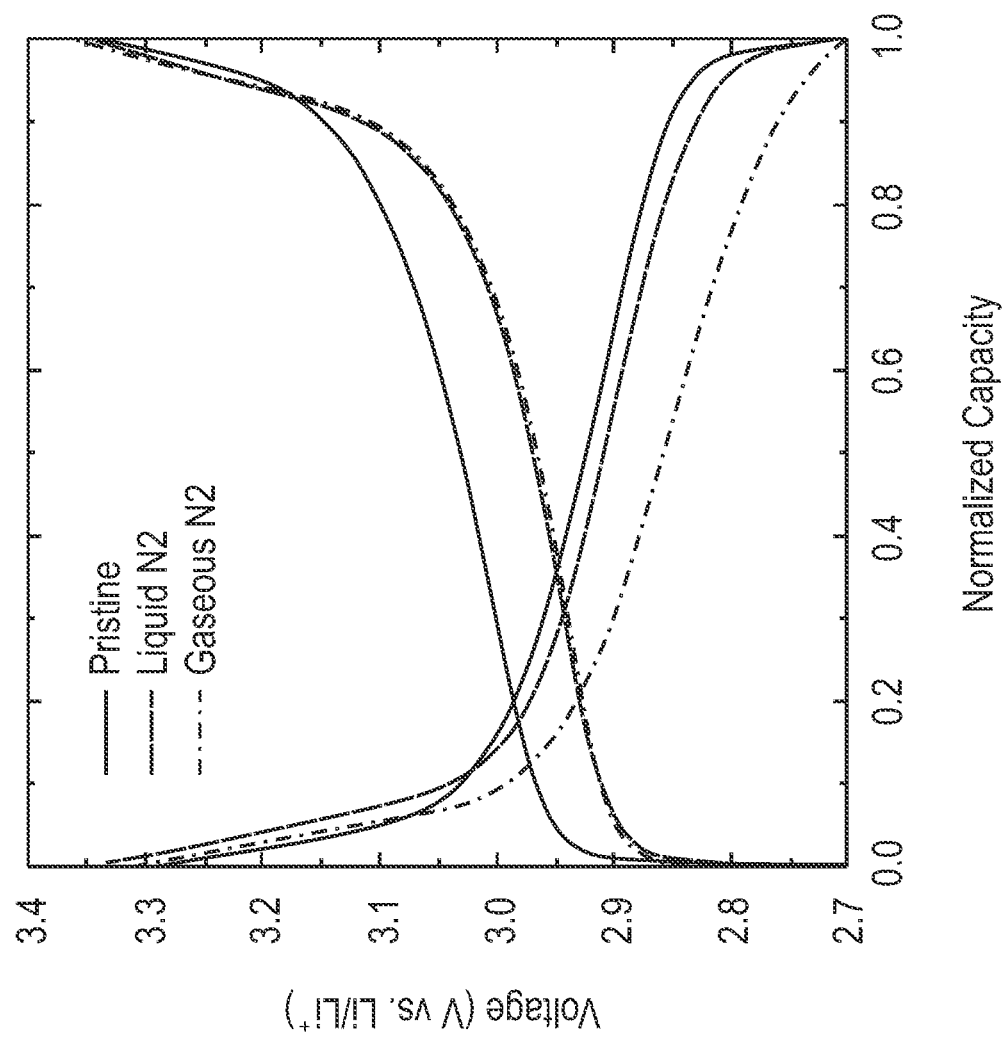
FIG. 5 is a graph showing the normalized electrochemical patterns for rechargeable lithium halide batteries with pristine lithium, liquid N$_2$ treated lithium, and gaseous N$_2$ treated lithium at a current density of 1 mA/cm$^2$ with an active cathode loading of 10 mg/cm$^2$.

FIG. 5 shows normalized electrochemical charge/discharge curves for three rechargeable lithium iodide (LiI) battery cells operated at a current density of 1 mA/cm$^2$ and fabricated with an active LiI cathode loading of 10 mg/cm$^2$ and the following anodes: (i) a pristine lithium anode, (ii) a liquid nitrogen treated lithium anode, and (iii) a gaseous nitrogen treated lithium anode. The electrochemical charge/discharge curves provide a comparison of the overpotential associated with each anode where the fraction of energy lost through overpotential provides the voltaic efficiency (i.e., the ratio of the average discharge voltage to the average charge voltage) of each cell. In FIG. 5, the voltaic efficiency of the cells is compared at a normalized capacity of 0.5 (i.e., approximately 50% of the state of charge and 50% of the state of discharge). The cell with the LN2 treated lithium anode has a narrow voltage gap while the cells with the pristine and GN2 treated lithium anodes have larger voltage gaps. The narrow voltage gap between the charge and discharge curves of the LN2 treated lithium anode indicates a battery cell with high voltaic efficiency (98.1%) while the larger voltage gaps of the pristine and GN2 treated lithium anodes indicate battery cells with lower voltaic efficiency (96.6% for pristine and 96.3% for GN2 treated lithium). The high voltaic efficiency of the cell with the LN2 treated anode shows that this cell has less resistive discharge and charge reactions than the cells with the pristine and GN2 treated anodes. By contrast, the low voltaic efficiency of the cells with the pristine and GN2 treated anodes shows that these cells have more resistive discharge and charge reactions than the LN2 treated anode.

Figure 6:
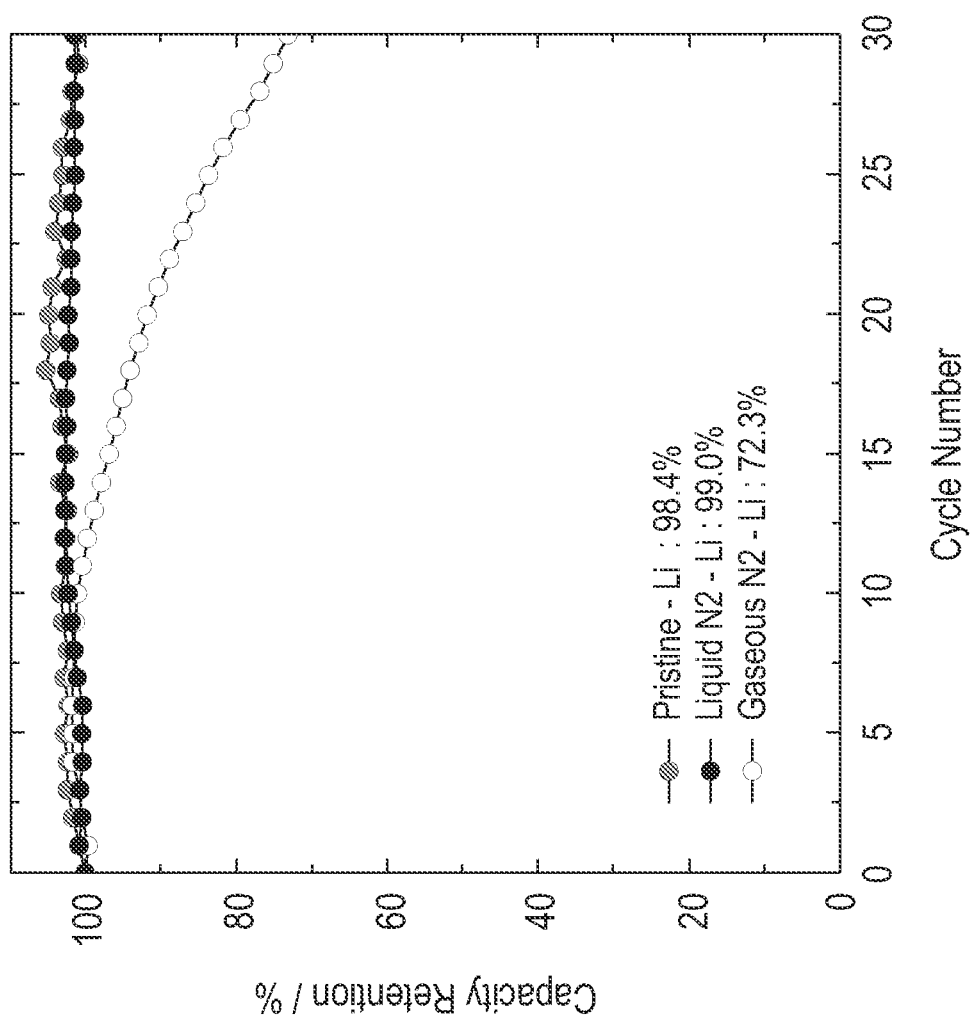
FIG. 6 is a graph showing the capacity retention of rechargeable lithium halide batteries with pristine lithium, liquid N$_2$ treated lithium, and gaseous N$_2$ treated lithium at a current density of 1 mA/cm$^2$ with an active cathode loading of 10 mg/cm$^2$.

FIG. 6 shows capacity retention curves for three rechargeable LiI battery cells operated at a current density of 1 mA/cm$^2$ and fabricated with an active LiI cathode loading of 10 mg/cm$^2$ and the following anodes: (i) a pristine lithium anode, (ii) an LN2 treated lithium anode, and (iii) a GN2 treated lithium anode. Over the course of 30 cycles, the cell with the GN2 treated anode degrades faster than the cells with the pristine and LN2 treated anodes. The capacity retentions for each battery are 98.4% for the pristine anode, 72.3% for the GN2 treated anode, and 99% for the LN2 treated anode. The data from FIG. 6 demonstrates that the battery cell with the LN2 treated anode has stable operation and obtains a higher capacity than the battery with the pristine and the GN2 treated anodes.

The foregoing data demonstrates that liquid nitrogen treatment of the anodes of metal halide batteries (i) increases the surface area of the anode; (ii) forms a stable nitrogen-containing passivation layer on the anode surface; and (iii) decreases the overpotential at charge and discharge. All of the foregoing results in a rechargeable metal halide battery with increased cell cycle stability, decreased battery cell resistance, and increased discharge capacity, over rechargeable metal halide batteries with untreated anodes or anodes treated with gaseous nitrogen.

In one embodiment, the anode of a rechargeable metal halide battery is treated with a liquid nitrogen compound for a period of time between 1-100 seconds. In another embodiment, the anode is treated for 10-100 seconds. In a further embodiment, the anode is treated for 10-80 seconds. In another embodiment, the anode is treated for 20-80 seconds. In a further embodiment, the anode is treated for 30-70 seconds. In another embodiment, the anode is treated for 30-50 seconds. In a further embodiment, the anode is treated for 30 seconds. In another embodiment, the liquid nitrogen treatment forms a passivation layer comprising a nitrogen-containing compound on the surface of the anode. In a further embodiment, the nitrogen-containing compound is selected from the group consisting of a metal nitride, a metal nitrite, a metal nitrate, and combinations thereof. In another embodiment, the nitrogen-containing compound comprises a metal nitride. In further embodiment, the anode is a lithium metal and the liquid nitrogen-induced passivation layer formed on the surface of the anode is a lithium nitride ($Li_3N$) layer. In another embodiment, the liquid nitrogen-induced passivation layer on the surface of the metallic anode has an atomic nitride (N1s) concentration greater than 0.5%. In a further embodiment, the passivation layer comprises a metal nitride and a metal oxide where the concentration of the metal nitride is greater than the concentration of the metal oxide. In another embodiment, the metal nitride is lithium nitride ($L_3N$) and the metal oxide is lithium oxide ($Li_2O$) and the concentration of the $L_3N$ is greater than the concentration of the $Li_2O$.

In a further embodiment, the rechargeable metal halide battery comprises a battery stack comprising a metallic anode, a cathode, and an electrolyte comprising at least one ion-conducting material. In another embodiment, the rechargeable metal halide battery comprises a battery stack comprising a lithium anode, a cathode incorporated into an electrically conductive material, and an electrolyte comprising an organic solvent and at least one ion-conducing salt. In a further embodiment, the surface of the anode is treated with the liquid nitrogen prior to fabrication in a battery stack.

In another embodiment, the metallic anode comprises at least one alkali metal. Examples of alkali metals are lithium (Li), sodium (Na), potassium (K), rubidium (Rb), cesium (Cs), and francium (Fr). In a further embodiment, the metallic anode comprises at least one alkaline earth metal. Examples of alkaline earth metal are beryllium (Be), magnesium (Mg), calcium (Ca), strontium (Sr), barium (Ba), and radium (Ra).

In a further embodiment, the metal halide of the cathode comprises (i) a metal ion such as $Li^+$, $Mg^+$, $Zn^+$, $Al^+$, $Na^+$, and combinations thereof; and (ii) a halide ion such as $I^-$, $Br^-$, $Cl^-$, $F^-$, and combinations thereof. In another embodiment, the cathode comprises a metal halide incorporated into an electrically conductive material. In a further embodiment, the electrically conductive material comprises a carbon-based material. Examples of carbon-based materials include, without limitation, carbon black, carbon nanotubes, carbon nanofibers, carbon dots, activated carbon, amorphous carbon, graphite, graphene, graphene oxide, and combinations thereof. In another embodiment, the carbon-based material is porous and has a surface area higher than 10 $m^2/g$.

In a further embodiment, the ion-conducting material of the electrolyte is an ion-conducting salt. In another embodiment, the ion-conducting salt is a lithium salt. Examples of lithium salts include, without limitation, lithium nitrate ($LiNO_3$), lithium fluoride (LF), lithium bis(trifluoromethanesulfonyl)imide (LiTFSI; $LiC_2F_6NO_4S_2$), lithium trifluoromethanesulfonate ($LICF_3SO_3$), lithium hexafluorophosphate ($LiPF_6$), lithium hexafluoroarsenate ($LIAsF_6$), lithium perchlorate ($LiClO_4$), lithium tetrafluoroborate ($LiBF_4$), lithium bis(oxalate)borate (LiBOB), and combinations thereof.

In a further embodiment, the organic solvent of the electrolyte includes, without limitation, nitriles, ethers, carbonates, heterocyclic compounds, glymes, and combinations thereof.

In another embodiment, the electrolyte further comprises an oxidizing gas. In a further embodiment, the ion-conducting salt is a lithium salt. In another embodiment, the electrolyte is in physical contact with the anode and the cathode.

The liquid-nitrogen treated lithium metal anode described herein can be coupled with intercalation cathodes (used in conventional lithium-ion and sodium-ion batteries), conversion cathodes (used in next generation Li—I, Li—S, Li—$O_2$ batteries), or hybrid intercalation/conversion cathodes. Intercalation cathodes are comprised of metal oxides, which include, without limitation, NMC (lithium nickel manganese cobalt), LCO (lithium cobalt), LFP (lithium iron phosphate), and combinations thereof. Conversion cathodes, include, without limitation, sulfur, oxygen, metal halides, and combinations thereof.

When the liquid-nitrogen treated metal anode described herein is coupled with conversion cathodes that do not use heavy metals, such as cobalt and nickel, the fabrication costs of the battery could be reduced over currently used rechargeable batteries that require such heavy metals. The reduced cost of the battery fabrication coupled with the high utilization rate of the active cathode species at high areal loading enables the battery described herein to be useful in a wide range of applications, including electronic devices and electric vehicles.

The descriptions of the various aspects and/or embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the aspects and/or embodiments, the practical application or technical improvement over technologies found in the marketplace, or to enable others of ordinary skill in the art to understand the aspects and/or embodiments disclosed herein.

EXPERIMENTAL

The following examples are set forth to provide those of ordinary skill in the art with a complete disclosure of how to make and use the aspects and embodiments of the invention as set forth herein. While efforts have been made to ensure accuracy with respect to variables such as amounts, temperature, etc., experimental error and deviations should be considered. Unless indicated otherwise, parts are parts by weight, temperature is degrees centigrade, and pressure is at or near atmospheric. All components were obtained commercially unless otherwise indicated.

Example 1

Electrochemical Performance of Rechargeable Lithium Iodide Battery Prepared with Liquid Nitrogen-Treated Lithium Metal Anode To produce a liquid nitrogen treated anode, lithium metal was dipped in liquid nitrogen for the following time intervals: 0, 3, 5, 10, 20, 30, 60, 120, 180, and 300 seconds. The treated lithium metal was then used as an anode for a lithium iodide battery. A cathode was composed of Ketjen black coated carbon cloth as a host structure with a LiI active material and prepared by dosing the LiI in methanol solution (0.5 M) onto the pre-formed carbon cathode. After dosing, the carbon-LiI composite cathode was dried on a 120° C. hotplate overnight and all preparation were conducted in an Ar-filled glove box. For the electrolyte, a mixture of 0.2M $LiNO_3$ and 0.5M LiTFSI (lithium bis(trifluoromethanesulfonyl)imide) in 3-methoxypropionitrile (MPN) and 1,2-dimethoxyethane (DME) was used. A CELGARD® 2325 separator (Celgard, LLC, Charlotte, NC, USA) was applied between cathode and anode. All components were assembled in the Swagelok cell and the oxidizing gas containing oxygen is continuously feeding to the cell during cell operation. The specific capacity of the batteries at a current density of 5 $mA/cm^2$ with an active lithium iodide cathode loading of 10 $mg/cm^2$ at different liquid nitrogen dipping times is shown in in FIG. 1. SEM images of the surface of the pristine lithium metal and the 30-second liquid nitrogen modified lithium metal are shown in FIG. 2. Symmetric electrochemical performance tests (with the same Li/Li cells also assembled in a Swagelok cell with the same electrolyte and separator) conducted at a current density of 0.5 $mA/cm^2$ on battery cells fabricated with anodes made of the pristine lithium metal and the 30-second liquid nitrogen treated lithium metal are shown in FIG. 3.

Example 2

Comparison of Pristine, Liquid Nitrogen Treated, and Liquid Gas Treated Lithium Metal Anodes Lithium metals treated with liquid nitrogen were compared to a lithium metal treated with gaseous $N_2$. For liquid N₂ treatment, two lithium samples were prepared by controlling the temperature of a lithium surface prior to surface modification. The first liquid nitrogen treated lithium metal sample (LN2-RT) was attached to a stainless steel (SS) foil as a metallic current collector at room temperature and directly dipped into liquid nitrogen for 30 seconds to form a passivation layer on the top of the lithium surface. The second liquid nitrogen treated lithium metal sample (LN2-LT), which was also attached to an SS current collector, was placed into an Ar-filled tube and tightly sealed. The tube was then dipped into liquid nitrogen for 5 min in order to bring the temperature of the lithium surface to below 0° C. Next, the LN2-LT sample was removed from the tube and dipped into liquid nitrogen for 30 seconds to form a passivation layer on the top of the lithium surface. The gaseous nitrogen treated lithium metal sample (GN2-RT) was prepared in a lab-made container having a gas inlet and outlet valve. The lithium metal was placed in the container where gaseous nitrogen of 1.1 bar (higher than atmospheric pressure) was flown through the container. After 30 seconds exposure, the container was purged with Ar gas and the exposed lithium metal was removed for testing. The presence of an $Li_3N$ layer formed from each treatment was analyzed by X-ray diffractometer (XRD) and X-ray photoelectron spectroscopy (XPS). The results of the XRD and XPS analyses are shown in FIGS. 4A and 4B, respectively. Normalized electrochemical patterns and capacity retention of battery cells fabricated with anodes made of pristine lithium metal, 30-second liquid nitrogen treated lithium metal, and N₂ gas treated lithium metal were also tested at a current density of 1 mA/cm² and an active lithium iodide cathode loading of 10 mg/cm². The results of the electrochemical test are shown in FIG. 5 and the results of the capacity retention test are shown in FIG. 6.

We claim:

1. A method of fabricating a battery comprising:
forming a battery stack comprising a metallic anode treated for 1-100 seconds with liquid nitrogen to form a passivation layer comprising a nitrogen-containing compound on a surface of the metallic anode, a cathode, and an electrolyte comprising at least one ion-conducting material, wherein the electrolyte is in physical contact with the anode and the cathode.

2. The method of claim 1, wherein the metallic anode is treated with the liquid nitrogen for 10-80 seconds.

3. The method of claim 1, wherein the metallic anode is dipped in liquid nitrogen prior to the forming of the battery stack.

4. The method of claim 1, wherein the nitrogen-containing compound is metal nitride.

5. The method of claim 1, wherein the passivation layer increases the surface area of the anode and suppresses dendrite growth on the anode surface.

6. The method of claim 1, wherein the passivation layer further comprises a metal oxide, wherein the concentration of the nitrogen-containing compound in the passivation layer is higher than the concentration of the metal oxide.

7. The method of claim 1, wherein the metallic anode comprises at least one alkali metal and/or at least one alkaline earth metal.

8. The method of claim 1, wherein the metallic anode comprises a metal selected from the group consisting of lithium (Li), sodium (Na), potassium (K), rubidium (Rb), cesium (Cs), francium (Fr), beryllium (Be), magnesium (Mg), calcium (Ca), strontium (Sr), barium (Ba), radium (Ra), and combinations thereof.

9. The method of claim 1, wherein the cathode is an intercalation cathode and/or a conversion cathode.

10. The method of claim 1, wherein the cathode comprises a metal halide incorporated into an electrically conductive material.

11. The method of claim 10, wherein the metal halide comprises a metal ion and a halide ion, wherein the metal ion is selected from one or more of $Li^+$, $Mg^+$, $Zn^+$, $Al^+$, and $Na^+$ and the halide ion is selected from one or more of $I^-$, $Br^-$, $Cl^-$, and $F^-$.

12. The method of claim 10, wherein the electrically conductive material is a carbon material selected from the group consisting of carbon black, carbon nanotubes, carbon nanofibers, carbon dots, activated carbon, amorphous carbon, graphite, graphene, graphene oxide, and combinations thereof.

13. The method of claim 1, wherein the at least one ion-conducting material is a lithium salt selected from the group consisting of lithium nitrate ($LiNO_3$), lithium fluoride (LiF), lithium bis(trifluoromethanesulfonyl)imide (LiTFSI; $LiC_2F_6NO_4S_2$), lithium trifluoromethanesulfonate ($LiCF_3SO_3$), lithium hexafluorophosphate ($LiPF_6$), lithium hexafluoroarsenate ($LiAsF_6$), lithium perchlorate ($LiClO_4$), lithium tetrafluoroborate ($LiBF_4$), lithium bis(oxalate)borate (LiBOB), and combinations thereof.

14. The method of claim 1, wherein the electrolyte further comprises an organic solvent selected from the group consisting of nitriles, ethers, carbonates, heterocyclic compounds, glymes, and combinations thereof.

15. The method of claim 1, wherein the electrolyte further comprises an oxidizing gas selected from the group consisting of oxygen, air, nitric oxide, nitrogen dioxide, and combinations thereof.

16. A method of fabricating a battery comprising:
pre-treating a lithium anode for 1-100 seconds with liquid nitrogen to form a lithium nitride passivation layer on a surface of the anode; and
forming a battery stack comprising the pre-treated lithium anode, a cathode comprising a metal halide incorporated into an electrically conductive material, and an electrolyte comprising at least one organic solvent and at least one ion-conducting material, wherein the electrolyte is in physical contact with the anode and the cathode.

17. The method of claim 16, wherein the lithium nitride passivation layer increases the surface area of the anode and suppresses dendrite growth on anode surface.

18. The method of claim 16, wherein the cathode is an intercalation cathode and/or a conversion cathode.

19. The method of claim 16, wherein the electrolyte further comprises an oxidizing gas selected from the group consisting of oxygen, air, nitric oxide, nitrogen dioxide, and combinations thereof.

* * * * *